3,505,009
METHOD OF MANUFACTURING SODIUM CARBONATE

Marina Adriana van Damme-van Weele, Hengelo, and Bernardus G. Wienk, Oldenzaal, Netherlands, assignors to N.V. Koninklijke Nederlandsche Zoutindustrie, Hengelo, Netherlands
No Drawing. Filed Oct. 16, 1967, Ser. No. 675,333
Claims priority, application Netherlands, Oct. 17, 1966, 6614553
Int. Cl. C01d 7/18, 7/12
U.S. Cl. 23—65                                        3 Claims

ABSTRACT OF THE DISCLOSURE

A method of manufacturing sodium carbonate by the ammonia-soda process in which sodium hydroxide is used in addition to sodium chloride as a starting material, and in which the sodium hydroxide is entirely or partially precarbonated to $Na_2CO_3$ with carbon dioxide gas, and in which that part of the mother liquor of the sodium bicarbonate produced in a production tower is recycled and is incorporated into the feed mixture for the production tower.

---

This invention relates to a method of manufacturing sodium carbonate by the ammonia-soda process wherein besides sodium chloride also an amount of sodium hydroxide is used as a starting material.

Such a method is described, for example, in Chemiker Zeitung 80 (1956) pages 671–673, wherein on page 673 it is proposed to process the sodium hydroxide solution obtained in the diaphragm electrolysis of brine to bicarbonate in a combination with a Solvay process. In the Dutch patent application 294,673 a more detailed description is given of a method of processing a mixture of ammoniated brine and diaphragm cell liquor in a production tower. This patent application also mentions the possibility of precarbonating the liquor with gases having a low $CO_2$ content.

However, if it is tried to make full use of such a cheap carbon dioxide gas, that is to say if it is tried to convert the NaOH present in the solution into $Na_2CO_3$ by treating the solution, for instance, with flue gas prior to its mixing with the brine, it has been found that even when using relatively small amounts of NaOH precipitates are formed in the feed mixtures for the production towers thus obtained. If, for instance, more than ⅓ of the normal feed brine is replaced by diaphragm cell liquor wherein the NaOH has been precarbonated to $Na_2CO_3$ and if the amount of ammonia required for a good conversion is added to the mixture thus obtained in a usual manner by introducing asborption gas, a precipitate is formed in the liquid. It might be possible to avoid this difficulty by separately introducing the precarbonated cell liquor and the ammoniated brine into the production towers. In that case, however, all the required absorption gas would have to be absorbed in the diminshed quantity of normal brine whereby the solubility limit for sodium salts, which, in fact, is already approached rather near in the normal ammoniation, would be surpassed rather soon. It apepars that this quantity of feed brine, which is small anyhow in this case, rather quickly fails to dissolve the "scale" (incrustations of salts) present in the cleaning tower within the time limits determined by the use of four or five production towers.

According to the invention these and similar problems resulting from the introduction of a precarbonated sodium hydroxide solution into the amomnia-soda process are solved by adding part of the mother liquor of the sodium bicarbonate produced in the production tower to the mixture of feed brine and precarbonate sodium hydroxide solution.

It has been found that only relatively small quantities of mother liquor need be added to provide the feed mixture with a sufficient dissolving capacity for the "scale" so that the loss of production capacity caused by the recirculation of mother liquor is small or negligible. Evidently, the consumption of salt and sodium hydroxide per unit of sodium carbonate produced need not be influenced by this recirculation of mother liquor at all.

In accordance herewith the invention relates to a method of manufacturing sodium carbonate by the ammonia-soda process wherein besides sodium chloride also an amount of sodium hydroxide is used as a starting material and wherein NaOH is entirely or partially precarbonated to $Na_2CO_3$ with carbon dioxide gas, characterised in that part of the mother liquor of the sodium bicarbonate produced in a production tower is recycled and is incorporated into the feed mixture for the production tower.

In particular, the invention can be advantageously applied in processing the liquor obtained in the usual diaphragm cell electrolysis of brine since this cell liquor has a particularly high Na-ions content as compared with a normal feed brine, which, on the one hand, favours the conversion but, on the other hand, aggravates the solubility problems.

It has been found, for example, that when 1 part of diaphragm cell liquor containing from 6 to 6.6 gram-ions of $Na^+$ per litre is mixed, after precarbonation, with from ½ to 2 parts of a normal feed brine containing, prior to ammoniation, from 5 to 5.4 gram-ions of $Na^+$ per litre, a recirculation of not more than 30% of the mother liquor was required and for a mixture of 1:1, for instance, not more than 10 to 15%.

According to the invention it is also possible to use the diaphragm cell liquor as such as a feed mixture of sodium chloride and sodium hydroxide. Of course, in this case a greater recirculation of mother liquor is required but it has been found that even then no more than 40% of the mother liquor has to be recycled to give the feed mixture a sufficient dissolving capacity for "scale."

The invention will be elucidated hereinafter by some examples which, otherwise, are not meant to restrict the invention in any respect. It is evident that for any ratio between NaCl and NaOH ($Na_2CO_3$) at any concentration of the feed mixture an appertaining mother liquor fraction to be recycled can be determined in a simple manner by experiment.

EXAMPLES

TABLE 1.—COMPOSITION OF THE BRINE AND THE DIAPHRAGM CELL LIQUOR USED

|  | Brine | Cell liquor | Precarbonated cell liquor |
|---|---|---|---|
| NaCl: |  |  |  |
| Percent by wt | 25.6 | 15.0 | 14.1 |
| G./l | 307 | 185 | 176 |
| Mol/l | 5.25 | 3.16 | 3.01 |
| $Na_2SO_4$: |  |  |  |
| Percent by wt | 0.5 | 0.5 | 0.4 |
| G./l | 5.7 | 5.7 | 5.45 |
| Mol/l | 0.04 | 0.04 | 0.038 |
| NaOH: |  |  |  |
| Percent by wt |  | 11.0 |  |
| G./l |  | 136 |  |
| Mol/l |  | 3.40 |  |
| $Na_2CO_3$: |  |  |  |
| Percent by wt |  |  | 13.8 |
| G./l |  |  | 172 |
| Mol/l |  |  | 1.62 |
| $H_2O$: |  |  |  |
| Percent by wt | 73.9 | 73.5 | 71.7 |
| G./l | 884 | 905 | 897 |
| Mol/l | 49.1 | 50.3 | 49.8 |
| Sp.d. (20° C) | 1.197 | 1.232 | 1.250 |

TABLE 2.—COMPOSITIONS OF MIXTURES OF BRINE AND PRECARBONATED CELL LIQUOR

| Cell liquor: brine in parts by vol. | 1:0 A | 2:1 B | 1:1 C | 1:2 D |
|---|---|---|---|---|
| NaCl: | | | | |
| Percent by wt | 14.1 | 17.8 | 19.7 | 21.7 |
| G./l | 176 | 219 | 242 | 263 |
| Mol/l | 3.01 | 3.76 | 4.13 | 4.5 |
| $Na_2SO_4$: | | | | |
| Percent by wt | 0.4 | 0.4 | 0.4 | 0.4 |
| G./l | 5.45 | 5.5 | 5.6 | 5.6 |
| Mol/l | 0.038 | 0.039 | 0.04 | 0.04 |
| $Na_2CO_3$: | | | | |
| Percent by wt | 13.8 | 9.3 | 7.0 | 4.7 |
| G./l | 172 | 114 | 86 | 57 |
| Mol/l | 1.62 | 1.08 | 0.81 | 0.54 |
| $H_2O$: | | | | |
| Percent by wt | 71.7 | 72.5 | 72.9 | 73.2 |
| G./l | 897 | 893 | 891 | 887 |
| Mol/l | 49.8 | 49.6 | 49.5 | 49.3 |
| Sp.d. (20° C.) | 1.250 | 1.231 | 1.224 | 1.212 |

When the amount of $NH_3$ required for a good conversion was added to the liquids A–D by introducing absorption gas consisting of 65% by volume of $NH_3$, 15% by volume of $CO_2$ and 20% by volume of $H_2O$, precipitates were formed. These precipitates could be dissolved by diluting with water but, of course, only at the cost of a loss of starting material. According to the invention this "dilution" was now effected by the addition of mother liquor as obtained after filtration of the bicarbonate. Hereby not only no additional amount is lost but also a saving in the consumption of lime and energy in expelling ammonia from this mother liquor is obtained. The case being, carbon dioxide may be expelled from the mother liquor by heating before it is mixed with the precarbonated feed brine to avoid the formation of precipitates, if any, in the mixture.

Table 3 indicates the amounts of mother liquor for the liquids A–D which are amply sufficient to give limpid feed mixtures for the production towers which also certainly have a sufficient dissolving capacity for the "scale" in the cleaning tower. Of course, some variation in these amounts of liquids is permitted and, in fact, the fractions indicated in the table are not meant to define a sharp lower limit. Thus, for instance, liquid A will still remain clear at a sufficient absorption of

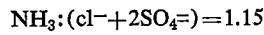

$$NH_3:(cl^-+2SO_4^=)=1.15$$

immediately after absorption, so that an equivalent ratio $NH_3:(cl^-+2SO_4^=)=1$ is obtained in the mother liquor in spite of losses due to blowing out in the cleaning and the production tower and to co-precipitation of $NH_4HCO_3$ with the $NaHCO_3$. In these examples the drawing temperature of the production towers is 30° C.

TABLE 3

| Liquid mixture according to table 2 | Fraction of the total quantity of mother liquor to be recycled | Conversion to bicarbonate calculated on the sum of NaOH and NaCl consumed and expressed as a percentage |
|---|---|---|
| A | ⅜ | 78 |
| B | ¼ | 77 |
| C | ⅛ | 76 |
| D | 1/16 | 75 |

What is claimed is:
1. In a method of manufacturing sodium caronate by the ammonia-soda process wherein besides sodium chloride also an amount of sodium hydroxide is used as a starting feed mixture material to a carbonation tower and wherein the NaOH is wholly or partly precarbonated to $Na_2CO_3$ with carbon dioxide gas, the improvement wherein that part of the mother liquor of the sodium bicarbonate formed in said carbonation tower is recycled and is incorporated into the feed mixture fed to the carbonation tower.

2. The method according to claim 1, wherein diaphragm cell liquor containing sodium chloride and sodium hydroxide is processed in the ammonia-soda process.

3. The method according to claim 2, wherein diaphragm cell liquor containing from 6 to 6.6 gram-ions of Na per litre in admixture with from ½ to 2 parts of normal feed brine consisting essentially of sodium chloride is used as a feed mixture in said ammonia-soda process and wherein 5 to 30% of the mother liquor of the $NaHCO_3$ production is recirculated.

References Cited

UNITED STATES PATENTS

| 2,666,686 | 1/1954 | Miller et al. | 23—65 |
| 2,787,521 | 4/1957 | Roberts et al. | 23—65 |
| 3,368,866 | 2/1968 | Seguela | 23—63 |

OSCAR R. VERTIZ, Primary Examiner

G. T. OZAKI, Assistant Examiner

U.S. Cl. X.R.

23—63